United States Patent [19]
Anupam et al.

[11] Patent Number: 5,966,139
[45] Date of Patent: Oct. 12, 1999

[54] SCALABLE DATA SEGMENTATION AND VISUALIZATION SYSTEM

[75] Inventors: Vinod Anupam, Union; Charles Douglas Blewett, Madison, both of N.J.; Theodore F. Leibfried, Houston, Tex.; Shaul Dar, Neot Afeka, Israel; Eric David Petajan, Watchung, N.J.

[73] Assignee: Lucent Technologies Inc., Murray Hill, N.J.

[21] Appl. No.: 08/739,905

[22] Filed: Oct. 30, 1996

Related U.S. Application Data

[60] Provisional application No. 60/008,078, Oct. 31, 1995.

[51] Int. Cl.[6] ................................... G06T 15/00
[52] U.S. Cl. .......................... 345/440; 345/428; 345/439
[58] Field of Search ..................... 345/440, 428, 345/439, 442, 133, 134, 135, 139, 140, 348, 356, 357; 707/503, 509, 3, 102, 104; 705/7, 35

[56] References Cited

U.S. PATENT DOCUMENTS

| | | | |
|---|---|---|---|
| 4,845,653 | 7/1989 | Conrad | 345/346 |
| 5,261,031 | 11/1993 | Saito | 345/440 |
| 5,509,112 | 4/1996 | Doi et al. | 345/440 |
| 5,557,716 | 9/1996 | Oka et al. | 345/440 |
| 5,611,035 | 3/1997 | Hall | 345/440 |
| 5,632,009 | 5/1997 | Rao et al. | 707/509 |
| 5,636,350 | 6/1997 | Eick et al. | 345/440 |
| 5,652,842 | 7/1997 | Siegrist, Jr. et al. | 705/2 |
| 5,670,984 | 9/1997 | Robertson et al. | 345/139 |
| 5,672,381 | 9/1997 | Strasnick et al. | 345/355 |
| 5,675,760 | 10/1997 | Houwen et al. | 345/440 |

OTHER PUBLICATIONS

V. Anupam, et al., "DataSpace: 3D Visualization of Large Databases," in IEEE Symposium on Information Visualization (Oct. 1995), pp. 82–88.

J. Ashley, et al., "The Query By Image Content (QBIC) System", Proc. of SIGMOD 1995, p. 475 (1995).

J. D. Foley, et al., Computer Grphics Principles and Practice (Addison–Wesley, 1990), cover page.

W. L. Hibbard, et al., "A Lattice Model for Data Display", Proc. of Visualization '94 pp. 310–317 (1994).

D.A. Keim, et al., "Supporting Data Mining of Large Databases by Visual Feedback Queries", Proc. of 10th International Conference on Data Engineering (1994).

P. Selfridge, et al., "IDEA: Interactive Data Exploration and Analysis," Proceedings of ACM–SIGMOD '96 pp. 24–34.

*Primary Examiner*—Stephen S. Hong

[57] ABSTRACT

A method and system for visualizing relatively large amounts of data in a limited display space includes segmenting the data, mapping each segment to a node within the display space based on a specified nodal layout, texture mapping each graphical display of each segment of data to its node, and displaying the data in each node of the display space as mapped. This visualization scheme enables a user to map a relation to a specification of an N-dimensional display, by designating how attributes are to be used to get a desired segmentation, layout and presentation and enables a user to explore the data with various exploring features including real time continuous scaling.

8 Claims, 8 Drawing Sheets

| Stack | LayDim | Stock | Industry | High | Low | Open | Close | Vol |
|---|---|---|---|---|---|---|---|---|
|  | X |  |  |  |  |  |  |  |
|  | Y |  |  |  |  |  |  |  |
|  | Z |  |  |  |  |  |  |  |
|  | NodeX |  |  |  |  |  |  |  |
|  | NodeY |  |  |  |  |  |  |  |

FIG. 3

| Stack | LayDim | Stock | Industry | High | Low | Open | Close | Day | VolBin |
|---|---|---|---|---|---|---|---|---|---|
|  | X |  | * |  |  |  |  |  |  |
|  | Y |  |  |  |  |  |  |  | * |
| * | Z | * |  |  |  |  |  |  |  |
|  | NodeX |  |  |  |  |  |  | * |  |
|  | NodeY |  |  |  |  |  | * |  |  |

FIG. 4

| Stack | LayDim | Stock | Industry | High | Low | Open | Close | Day | Vol |
|---|---|---|---|---|---|---|---|---|---|
|  | X |  | * |  |  |  |  |  |  |
| * | Y | * |  |  |  |  |  |  |  |
|  | Z |  |  |  |  |  |  |  |  |
|  | NodeX |  |  |  |  |  |  | * |  |
| * | NodeY |  |  | * | * | * | * |  |  |

| Step | Description |
|---|---|
| 1. | Capture Command-Line arguments, if any, else accept defaults; |
| 2. | Call XtAppInnitilize and Xt GetApplicationResources to parse the command line arguments stored in an option_values record; |
| 3. | Calculate the number of frames from start and end frame sizes and the C-value retrieved from command-line arguments or their defaults; |
| 4. | Allocate memory for an array of pointers to images in memory images[ ]; |
| 5. | Calculate the origin of the first captured image to be displayed, i.e. call XGetWindowAttributes to get the window parameters so as to calculate the center of the screen and then calculate:<br>    rect.x = x_center_of_screen - 1/2* option_values.startWidth;<br>    rect.y = y_center_of_screen - 1/2* option_values.startHeight; |
| 6. | Read the image from a file named by the command-line args and copy it using XReadBitmapFile or similar function to read the image file into memory so as to allow mapping it to type XImage and then copy it to images[0].<br>Sst imagesindex = 1; |
| 7. | If the imagesindex >= number of frames then go to step 14; (While loop) |
| 8. | Calculate the next size for a reduced image from the variable frame stepsize formula (Rev 1 of White Paper on Variable Step Sizes 2 June 1995); |
| 9. | Calculate the next rect.x and rect.y (i.e. keep center of image in center of screen); |
| 10. | Resample the original image to fit into the new dimensions; |
| 11. | Copy the resampled image to images[imagesindex]; |
| 12. | Increment the imagesindex; |
| 13. | Go to step 7; |
| 14. | Initialize currentimageindex = 0; |
| 15. | Set up to create a main window "main_xtel" which is resizeable; |

FIG. 6B

16. Set up a quit button widget and callback routine to exit when the quit button is pressed;

17. Set up a DrawingArea widget and callback routine to Display images[currentimageindex] upon exposure of the "display window";

18. Set up to sense motion events of the mouse using Widgets calls and add an event handler (callback) routine to be activated when the left mouse button is pressed and the mouse is moved to the left or right 19. Use X-Toolkit routines to manage and start the endless loop waiting for callback events;

20. In the case of an exposure of the "main_xtel", the exposure callback will
   A.   Clear the area.
   B.   Put the original "BigImage" to the screen at its appointed location in the DrawingArea window (viewport).

21. In the case of a sustained Button1Press,
   A.   Sense the X-direction motion of the mouse and if the motion is beyond a predetermined threshold, then:
     (1)   if the motion is to the left and currentimageindex is < number of frames-1 then
       (a)   Erase images[currentimageindex];
       (b)   increment currentimageindex;
       (c)   Display images[currentimageindex];
       end if;
     (2)   if the motion is to the right and currentimageindex is > 0 then
       (a)   Increment currentimageindex;
       (b)   Display images[currentimageindex];
       end if;

22. In the case of release of Button1
   A.   if Button1Press done again in the DrawingArea window then go to 17;
   B.   if Button1Press on quit button then quitbutton_callback is activated which causes the program to exit;
   C.   if others then sleep until either 21 or 22 occurs;

23. End Algorithm.

FIG. 7A

| Step | Description |
|---|---|
| 1. | Capture Command-Line arguments, if any, else accept defaults; |
| 2. | Call XtAppInitialize and Xt GetApplicationResources to parse the command line arguments stored in an option_values record; |
| 3. | Calculate the number of frames from start and end frame sizes and the C-value retrieved from command-line arguments or their defaults; |
| 4. | Allocate memory for an array of pointers to images in memory images[ ]; |
| 5. | Calculate the origin of the first captured image to be displayed, i.e. call XGetWindowAttributes to get the window parameters so as to calculate the center of the screen and then calculate:<br>    rect.x = x_center_of_screen - 1/2* option_values.startWidth;<br>    rect.y = y_center_of_screen - 1/2* option_values.startHeight; |
| 6. | Read the image from a file named by the command-line args and copy it using XReadBitmapFile or similar function to read the image file into memory so as to allow mapping it to type XImage and then copy it to images[0]. Set Imagesindex = 1; |
| 7. | If the imagesindex >= number of frames then go to step 14; (While loop) |
| 8. | Calculate the next size for a reduced image from the variable frame stepsize formula (Rev 1 of While Paper on Variable Step Sizes 2 June 1995); |
| 9. | Calculate the next rect.x and rect.y (i.e. keep center of image in center of screen); |
| 10. | Resample the original image to fit into the new dimensions; |
| 11. | Copy the resample image to images[imagesindex]; |
| 12. | Increment the imagesindex; |
| 13. | Go to step 7; |
| 14. | Initialize currentimageindex = 0; |
| 15. | Set up to create a main window "main_xtel" which is resizeable: |
| 16. | Set up a quit button widget and callback routine to exit when the quit button is pressed; |

FIG. 7B

17. Set up a DrawingArea widget and callback routine to Display images[currentimageindex] upon exposure of the "display window;

18. Set up to sense motion events of the mouse using Widgets calls and add an event handler (callback) routine to be activated when the left mouse button is pressed and the mouse is moved to the left or right;

19. Use X-Toolkit routines to manage and start the endless loop waiting for callback events;

20. In the case of an exposure of the "main_xtel", the exposure callback will
   A. Clear the area,
   B. Put the original "Bigimage" to the screen at its appointed location in the DrawingArea window (viewport),
   C. Get the values for the DrawingArea window and create a Pixmap buffer,
   D. Return to "loop";

21. In the case of a sustained Button1Press,
   A. Sense the X-direction motion of the mouse and if the motion is beyond a predetermined threshold, then:
      (1) if the motion is to the left and currentimageindex is < number of frames then
         (a) Size the Pixmap buffer to the size of the DrawingArea window and fill the buffer with theforeground color of the graphics context,
         (b) increment currentimageindex,
         (c) Put images[currentimageindex] into the prescribed location of the Pixmap buffer,
         (d) Copy the Pixmap buffer into the frame buffer for display by using the XcopyArea Xlib routine,
         end if;
      (2) if the motion is to the right and currentimageindex is > 0 then
         (a) increment currentimageindex;
         (b) Display images[currentimageindex];
         end if;
   B. When button released return to "loop";

22. In the case of release of Button1
   A. if Button1Press done again with mouse movement in the DrawingArea window then go to 21,
   B. if Button1Press on quit button then quitbutton_callback is activated which causes the program to exit,
   C. if others then sleep until either 21 or 22 occurs;

23. End Algorithm (Double Buffer with contraction of image)

SCALABLE DATA SEGMENTATION AND VISUALIZATION SYSTEM

CROSS REFERENCE TO PROVISIONAL APPLICATION

This application claims the benefit of U.S. Provisional Application No. 60/008,078, filed on Oct. 30, 1995.

CROSS REFERENCE TO RELATED APPLICATION

This application is related to U.S. patent application Ser. No. 08/721,492, filed Sep. 27, 1996, entitled "A Flexible Data Visualization System and is copending and commonly assigned.

TECHNICAL FIELD

This invention relates to graphical visualization of relatively large amounts of relational data within a limited display space.

BACKGROUND OF THE INVENTION

Information visualization can be summarized as a mapping from an information space, where the information is stored, to a display space, which the user can visually explore. Existing visualization systems are described in S. G. Eick, et al., "SeeSoft—a Tool for Visualizing Line Oriented Software Statistics," IEEE Transactions on Software Engineering, vol. 18, no. 1, pp. 957–968. (November 1992); D. A. Keim, et al. "Supporting Data Mining of Large Databases by Visual Feedback Queries," Proc. of 10th International Conference on Data Engineering (February 1994); R. M. Picket and G. G. Grinstein, "Iconographic Displays for Visualizing Multidimensional Data," Proc. of IEEE Conf. on Systems, man, and Cybernetics, pp. 514–519, IEEE Press (1988) and W. S. Torgerson, "Multidimensional Scaling: Theory and Method," Psychometrika, vol. 17, pp. 201–419 (1952), hereby incorporated by reference as if fully set forth herein. These visualization systems usually provide a holistic display of the information using compact metaphors, with the goal of maximizing the amount of information to be viewed in the display space, as for example the screen of a computer monitor.

Current commercial relational database systems, such as Microsoft Access Relational Database Management System for Windows, as available from Microsoft Corp., offer little support for data visualization. Likewise, report generators, which serve as a front end to a relational database management system, using SQL to retrieve information from the database, provide limited or no functionality for segmentation or layout of the information, and essentially allow for simple presentations of subsets of a relation, e.g. using a line graph or pie chart. Examples of prior art database management systems include Business Objects, Esperant, Andyne SQL, IQ for Window and Impromptu. While these tools are useful for users who prefer to avoid SQL, they do not allow users to fully visualize relatively large data sets.

The importance of segmentation as a central operation in database exploration is emphasized in P. Selfridge et al., "IDEA: Interactive Data Exploration and Analysis," Proceedings of ACM-SIGMOD'96 pp. 24–34. The limitations of the SQL GROUP-BY operator as a segmentation facility are discussed in J. Gray, et al., "DataCube: A Relational Aggregation Operator Generalizing Group-By, Cross Tab, and Sub-Totals," Microsoft Technical Report MSR-TR-95-22 (October, 1995), hereby incorporated by reference as if fully set forth herein. Gross, et al., suggest a new operator called the Data Cube, which significantly generalizes both the GROUP-BY operator as well as the histogram, cross tabulation (also called pivot table), roll-up, drill-down and sub-total constructs found in most report generators. They also suggest several extensions to the standard set of SQL aggregate functions.

Another prior art system is the VisDB system which provides visual feedback queries for exploring large databases, described in D. A. Keim, et al, "Supporting Data Mining of Large Databases by Visual Feedback Queries," supra. The VisDB system seeks to maximize usage of the two dimensional ("2D") display screen by assigning each data item to a single pixel on the screen, and using the color and position of the pixel to indicate the relevance of the data item to the query. The VisDB system also incorporates the parallel coordinates and stick figures techniques for compact representation of large multidimensional data sets. See, for example, A. Inselberg and B. Dimsdale, "Parallel Coordinates: a Tools for Visualizing Multi-Dimensional Geometry," Proc. of Visualization '90, pp. 361–370, (1990), hereby incorporated by reference as if fully set forth herein and R. M. Picket and G. G. Grinstein, "Iconographic Displays for Visualizing Multidimensional Data," Proc. of IEEE Conf. on Systems, man, and Cybernetics, supra.

There are many systems that support visualization of a specific type of abstract data. For example, (i) TWIG as described in S. P. Reiss, "3D Visualization of Program Information" Extended Abstract and System Demonstration," hereby incorporated by reference as if fully set forth herein, is a package for visualizing programs; (ii) SeeSoft described in S. G. Eick, et al, "SeeSoft—a Tool for Visualizing Line Oriented Software Statistics," supra is a system for visualizing large software projects; and (iii) SeeNet described in R. A. Becker, et al., "Visualizing Network Data," IEEE Transactions on Visualizations and Graphics, vol. 1, no. 1, pp. 16–28 (March, 1995), hereby incorporated by reference as if fully set forth herein, is a system for visualizing connections in networks, such as the long distance telephone network. None of these systems, however, provide a general database visualization system in which any data can be explored.

SUMMARY OF THE INVENTION

The present invention relates to a visualization technique which enables a user to visualize relatively large amounts of data in a limited display space and having the functionality of continuous scaling. Although continuous scaling in general is well known in the art its complexity has prevented its practical application to the visualization technique described herein and related fields. The present invention while not claiming continuous scaling, claims the application of continuous scaling to a data visualization system and method. In accordance with the preferred embodiment of the present invention the visualization technique is implemented with three general steps. First, the stored information is segmented according to the user's instructions. Second, each segment is mapped to a region of a given display space, such as a video monitor. Third, the segmented information is displayed according to the mapping, in the display space. In various embodiments of the invention, a user is able to segment the display of selected information in various ways and explore different segments individually, or simultaneously with the ability to scale each segment along a near continuum in real time.

BRIEF DESCRIPTION OF THE DRAWINGS

FIG. 6 provides one preferred algorithm for caching sized images of a selected display, displaying the resized image as it's new size is being computed.

FIG. 7 provides one preferred algorithm for caching sized images of a selected display and displaying the image only after the entire image has been resized.

DETAILED DESCRIPTION OF THE INVENTION

Figure 1:
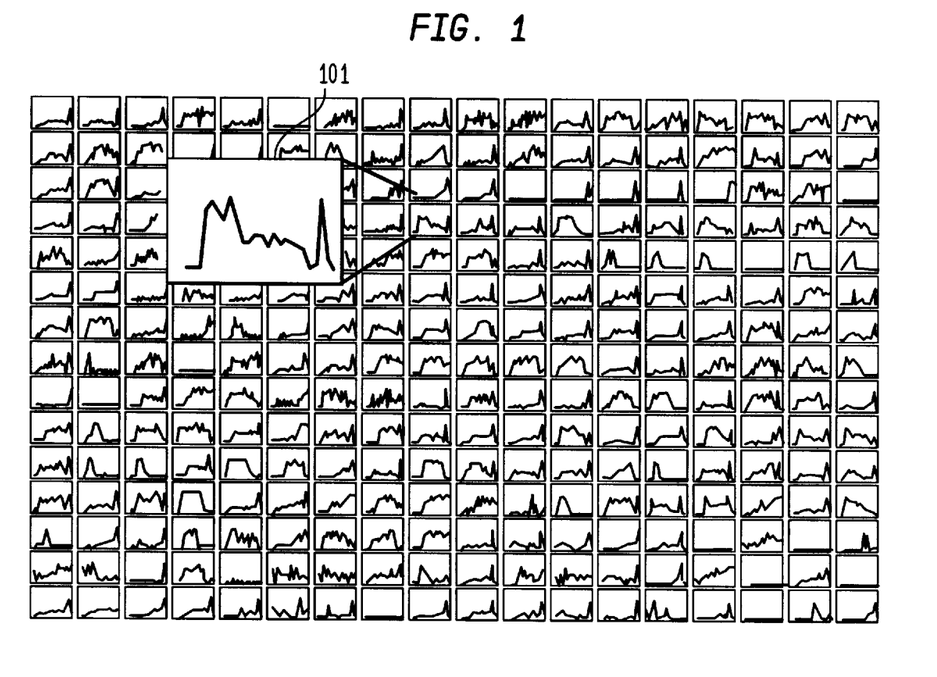
FIG. 1 illustrates a display space divided into a two dimensional array of nodes, where each node contains distinct information.

Given a relation R, a wide range of useful visualizations of R can be specified by segmenting relation R into a set of mutually exclusive relations $R_1 \ldots R_n$, mapping the relations $R_1 \ldots R_n$ into mutually exclusive regions of the display space, each region referred to as a "node" in the display, and specifying how information in each node is to be presented. The resulting display is a collection of nodes in the display space, such that each node presents information about some segment of the original relation. As used herein, segmenting on an attribute means to create a separate display of the data of a relation for each value of the attribute, or each value of an aggregated attribute. Referring to FIG. 1 one such visualization is shown where a display space is divided into a two-dimensional ("2D") array of nodes. Each node contains a distinct line graph representing one segment of the data. Although the individual nodes can be very small, closer observation of an individual node is still possible by selecting the node, such as node 101, for closer or comparative viewing. In accordance with the present invention and as described further below, the size and image within a selected node can be scaled along a near continuum of sizes between an arbitrary minimum and maximum size.

To further explore and explain various aspects of the present invention, consider the example of a business telephone relation, BUSPHONE with attributes: company, service, month and revenue. Each tuple in the BUSPHONE relation contains data relating to the revenue generated by a different company's monthly expenditure for a different telecommunication service. A user could visualize the BUSPHONE relation with the present invention using the embodiment shown in FIG. 1. BUSPHONE can be segmented on the COMPANY and SERVICE attribute value combinations, and each segment can be mapped to a node in 2D space, such that each row of nodes corresponds to a particular service and each column corresponds to a particular company. The axes corresponding to the rows and columns of nodes are also known as the layout axes. Thus, each node in the display space relates to a different company and service, and for each company and service, the corresponding node will contain a line graph plot of the revenue per month over a given number of months. Each node, as well as the entire display can also include tic marks, labels, legends, titles and other indicia common to graphs.

Various user interface applications can be devised to enable a user to create a particular visualization of specified data from a specified database. In one embodiment of the present invention, a user connects to a host on which at least one database resides. The user selects a relation from a list of relations in the database, and is then presented with the schema, i.e. the list of attributes, of the selected relation. The user may query the selected relation by specifying selection conditions for the attributes and an optional projection list. A tabular query form can be used as both the Query-By-Example ("QBE") concept described in M. M. Zloof, "Query-By-Example," Proc. of the National Computer Conference, pp. 431–438 (May, 1975), hereby incorporated by reference as if fully set forth herein, and similar to the interface offered by many commercial databases, such as Microsoft Access. Referring to the BUSPHONE example above, the user may request information about the first fifteen companies in the relation and the first twenty five months for which data is stored.

The user will also be prompted to specify a visualization of the query result relation and to specify how attributes are to be used to get a desired segmentation, layout and presentation. Depending on the design of the interface applications, one or more visualization schemes may be available. For example, suppose the user wishes to see the revenue, over the 25 month period, for each company and service combination. The user can specify that the COMPANY and SERVICE attributes be used to segment the BUSPHONE relation as illustrated in FIG. 1. The user can also layout the nodes such that the SERVICE attribute values of the node increase along the X axis of the display space and the COMPANY attribute values increase along the Y axis of the display space. Finally, the user can specify that the information in each node be presented as a line graph, using the MONTH attribute along the X axis of the node, and the REVENUE attribute along the Y axis of the node. Note that the display in each node is not limited to two dimensions, but can include a three dimensional ("3D") graph of data.

The user designates those role(s) of a selected attribute as the segmentation attribute, those to be plotted along the X, Y or Z layout axes, and those to be plotted along the X, Y or Z axis in each node. Additional parameters, such as the presentation format and the background and foreground colors to be used, can be selected from menus, or they can be left unspecified, in which case the system may use default values. After specifying the mapping, the user interface application can either automatically display the segmented and mapped data, or wait for the user's prompt to visualize the data.

Figure 2:
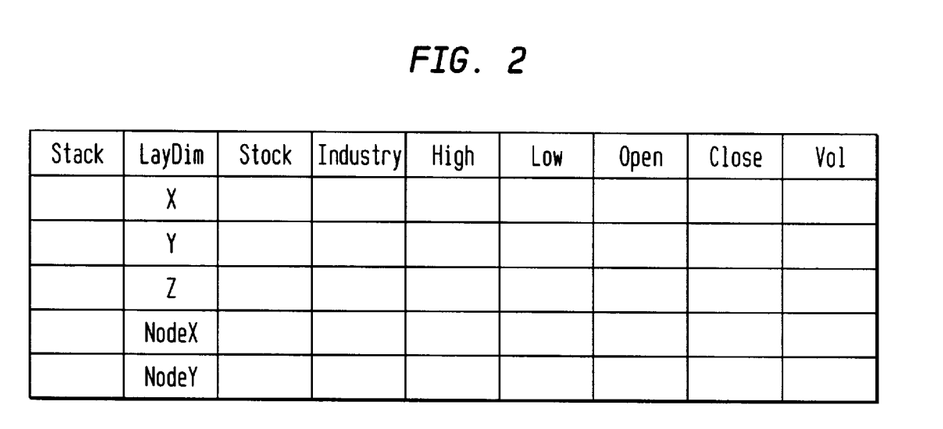
FIG. 2 illustrates a graphical user interface for specifying a visualization layout.

The present invention enables one of three types of mapping between the attributes of a database and a two or three dimensional layout of nodes in a display space. The desired mapping can be specified using a graphical interface such as shown in FIG. 2. Three basic mapping functions are used in combination to provide the desired juxtaposition of plots or nodes: the first mapping type is to simply map related attribute values directly to a node's axes. The second mapping uses one of the layout axes to stack multiple instances of a node. The third mapping stacks multiple plots relating to a given node, to one of the node axes.

For example, consider a database of stock data which includes industry type, daily, high, low, opening and closing share price and volume of shares for thousands of companies. A binned volume attribute could be derived from the volume attribute for classifying stocks according to which yearly total volume range it falls into (e.g., low, medium or high). One useful way to visualization this database is to plot one of the prices (e.g., closing) as a function of time for each stock (one stock per node) and map industry type to the X layout axis and volume bin to the Y layout axis. The multiple stock plots (nodes) which fall into a given industry type and volume bin could be "stacked" along the Z layout axis allowing direct comparison between them. This layout would use the first mapping function for industry type and binned volume, and the second mapping function for the stacking along the Z layout axis.

Another useful visualization would be to map each stock price type, e.g., high, low, etc., in a different plot in the same node. Industry type could be mapped to the X layout axis as in the previous example, but the Y layout axis would be used to stack multiple stocks of same industry type. While the attributes mapped to row, column and depth, in both examples, are interchangeable, it is preferred to minimize the number of depth planes as compared to the number of rows or columns in the layout, and to minimize the number of rows as compared to the number columns.

Figure 3:
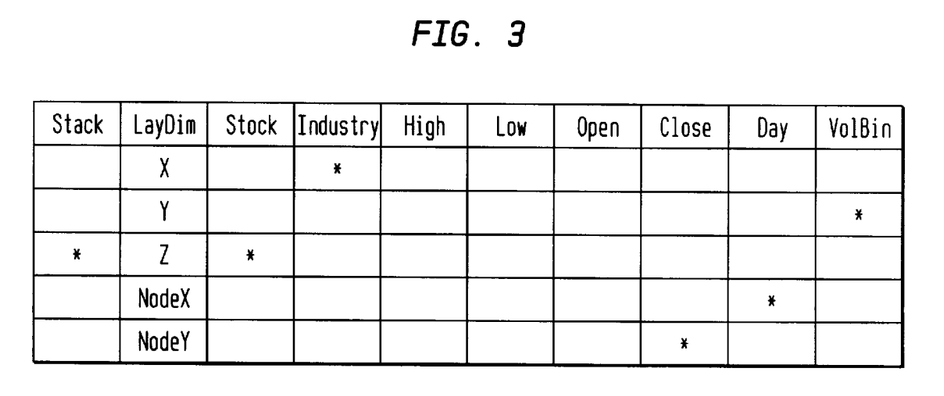
FIG. 3 illustrates one specified layout visualization where nodes are stacked along the Z axis of the display space.
Figure 4:
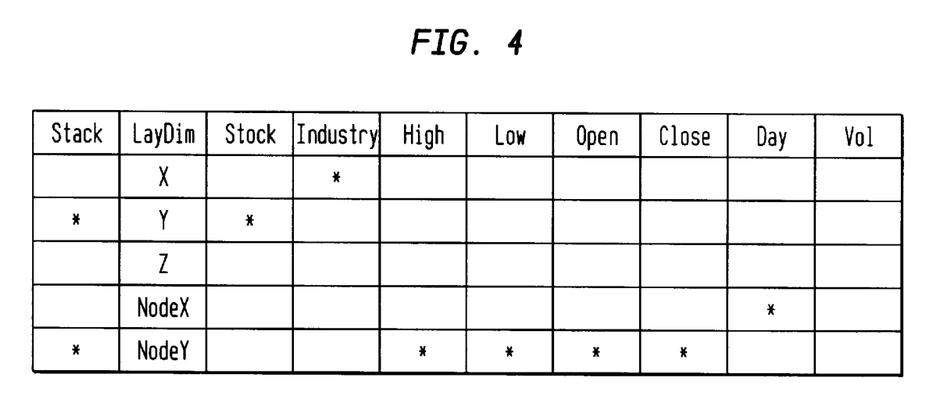
FIG. 4 illustrates another specified layout visualization where each node contains four stacked plots, each relating different information, and the Y axis of the display space is used to stack nodes rather than plot one attribute to a second attribute on the X or Z layout axis.

Referring to FIG. 3, each lattice or layout dimension can be used for stacking by clicking next to the X, Y, or Z layout dimension in the column labeled stack (second mapping type). Referring to FIG. 4, the third mapping type is selected by clicking in the stack column next to the node content X or Y dimensions and selecting multiple attributes along the given node content row (X or Y). The user interface can be designed to alert the user if illogical combinations of stacking and attributes are selected.

Many variations of the above example are possible and within the scope of the present invention. Some of the variations include interactively changing the properties of the display generated by the system. Specifically, the user may modify the layout of the nodes, change the representation of the data within the nodes, for example from a line graph to a bar graph or to a scatter plot, or control the colors used to depict the information, for example to use a different color for each row or column of nodes. The user interface may also allow the user to traverse the display with basic 3D graphic operations, such as zoom, rotation, translation, and animation. Additional facilities to assist the user in exploring the display, such as data drill-down and similarity queries, described below, are also possible.

Although the user interface to a database engine for visualizing the data in accordance with the present invention can use well known SQL statements, SQL alone will not support flexible segmentation and multi-dimensional scaling, two important capabilities of the visualization technique of the present invention.

The system of the present invention may provide a flexible segmentation facility, allowing the user to segment a relation on any attribute. Using the BUSPHONE example, when analyzing large data sets, the user may wish to segment the business phone data according to the values of the revenue attribute, as for example into low-revenue, medium revenue and high-revenue segments, and study each segment separately. Likewise, the user may appreciate the ability to dynamically change the number of segments and the segment boundaries.

One advantageous embodiment of a flexible segmentation user interface uses a ruler metaphor to indicate tab stops, such as those found in many word processing programs. For example, the user can specify a segmentation of the MONTH attribute range into eight equal intervals, or over arbitrary intervals.

The SQL GROUP-BY operator allows for segmentation based on individual attribute values, but not on attribute value ranges. The described flexible segmentation can be implemented, however, by using an auxiliary table to record segment boundary values. When the user specifies a segmentation, the system creates a new view that has the attributes of the segmented relation as well as a new computed attribute, SEGMENT_ID, which gives the segment value of each tuple. The schema of this view is presented to the user, who may query or visualize it like any other relation. Indeed, the SEGMENT_ID attribute may be used in either the node contents or layout in the display.

Figure 5:
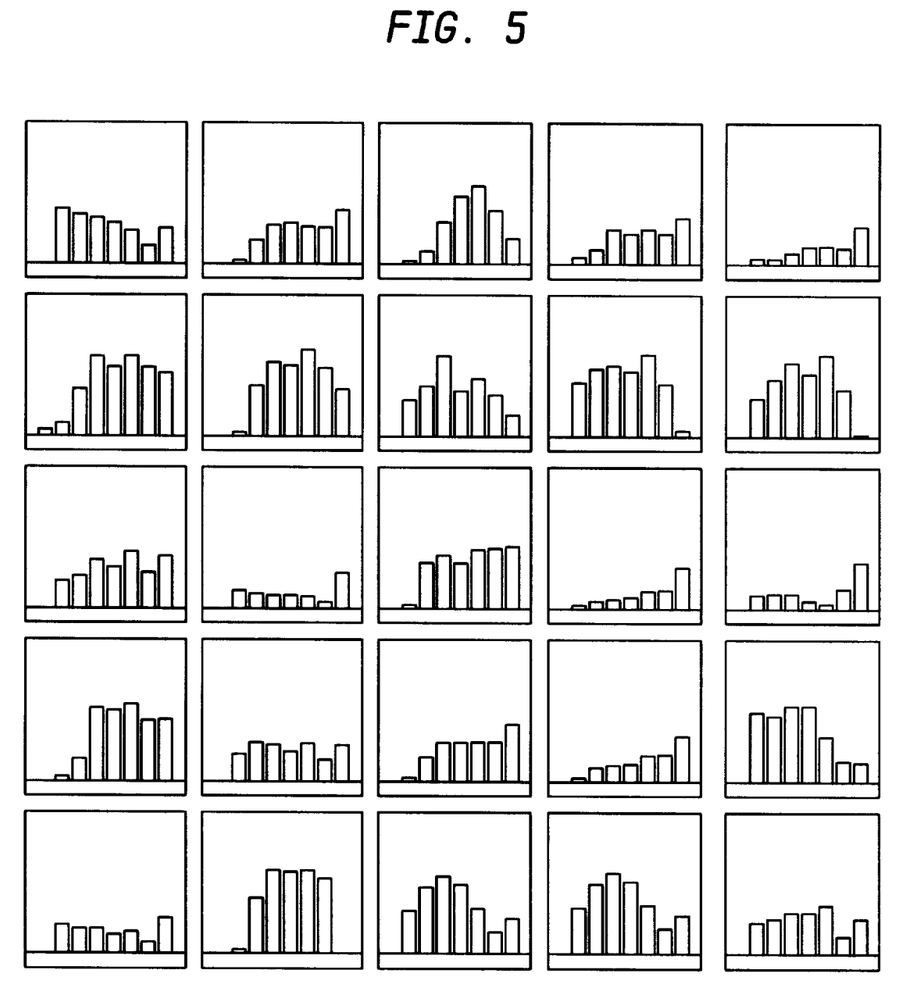
FIG. 5 illustrates the data visualization result of a flexible segmentation of the same data visualized in FIG. 1.

Segmentation is particularly beneficial in conjunction with aggregation. For example, instead of looking at the revenue values for each month, the user may wish to look at the total revenue for each quarter. The user can do so by grouping the data on the SEGMENT_ID attribute and aggregating the REVENUE attribute values using the SUM function. The result of this operation is shown in FIG. 5. As in FIG. 1 each node shows the revenues generated from the usage of a particular telecommunication service by some company over a twenty five month period. However, instead of the twenty five individual values in each node as in FIG. 1, each node in FIG. 5 shows eight aggregated quarter revenue values, represented in this case by a bar graph.

The user interface can also be designed to provide discrete segmentation of the data. For example, the user can specify that March and December (the "holiday months") be placed in one segment and the other ten months of the year be placed in another segment.

In one preferred embodiment of the present invention the data visualization system and method provide the functionality of interactive texture mapping. Texture mapping described in James D. Foley, Computer Graphics Principles and Practice (2d ed. 1990), hereby incorporated by reference as if fully set forth herein, is a process by which each pixel of an image is mapped to a polygon so that the image is stretched or compressed as one with the background polygon. Interactive texture mapping means that a sufficient number of display frames are generated in a given unit of time so that size changes appear continuous. In general, texture mapping refers to the continuous scaling of an image with arbitrary orientation.

While the art of texture mapping is well known its practical application is limited to high end and costly computers with very powerful processors to execute the large number of computations required for this process in real time. The present invention includes the functionality of continuous scaling by implementing a restricted form of texture mapping. In particular, for purposes of the Flexible Data Visualization System of the present invention, arbitrary orientation is an unnecessary functionality as all images are expected to be viewed in one orientation alone, i.e., normal to the display surface. By eliminating the requirement of arbitrary orientation, fewer instructions are needed to map images in the display to their respective nodes and enable continuous scaling. Consequently, a less costly and more practical hardware or software implementation of continuous scaling is possible.

In one preferred embodiment, the restricted texture mapping employed with the present invention is efficiently implemented so as to provide "near" continuum scaling. Many prior art computer applications allow a user to select a variety of discrete scales. The texture mapping process described above allows for a continuous stream of sizes. For example, an image can be dragged with a mouse or like pointing device resulting in a change in scale of the image along a continuum of sizes. It is believed that for purposes of the present invention it is more efficient to provide a scaling method somewhere between discrete scaling and continuous scaling, referred to herein as near continuous scaling. While near continuous scaling allows for a stream of scales by dragging a display with a mouse or like pointing device, the stream of sizes do not comprise a true continuum. Rather, only selected discrete sizes are generated but at a frame rate such that to the user it appears as if there are a continuum of scales.

Notwithstanding near continuous scaling, some sizes may take too long to generate so that the requisite frame rate, typically at least 5 Hz, is not achieved and the apparent continuity is lost. This occurs because the computer time required to generate an image is roughly proportional to the number of pixels in the image. For rectangular images this makes the time proportional to the height times the width of the image scene. For the special case of a square, the time is proportional to an edge length squared. For rectangular images with a given aspect ratio of height to width, the time is proportional to the width squared times the aspect ratio and so is still proportional to the square of one edge. Therefore, in the event that certain sizes may take too long to generate, these sizes, or other sizes between the selected discrete sizes, may be skipped. In other words, to maintain the necessary frame rate selected sizes are not generated.

In another preferred embodiment of the present invention real time display of continuous scaling is enhanced by caching all sizes of visible displays so that when a user chooses to scale an image the resized image is available from memory and it doesn't have to be computed while the users waiting. For instance where fifty of 100 nodes in a display are visible at any given time, all available sizes of the images in the fifty visible nodes are computed and cached. If a user scrolls the display screen so that ten views are dropped and a new set of ten views become visible the memory for the ten dropped views is cleared and images are generated and cached for the new visible views.

Referring to FIG. 6 one algorithm is shown for caching sized images of a selected display. FIG. 7 shows a similar algorithm that also provides double buffering. Double buffering gives the illusion of a quicker response since no part of an image is displayed until it has been entirely resized. With the algorithm of FIG. 6, however, the user watches as parts of the resized image separately appear.

Figure 8:
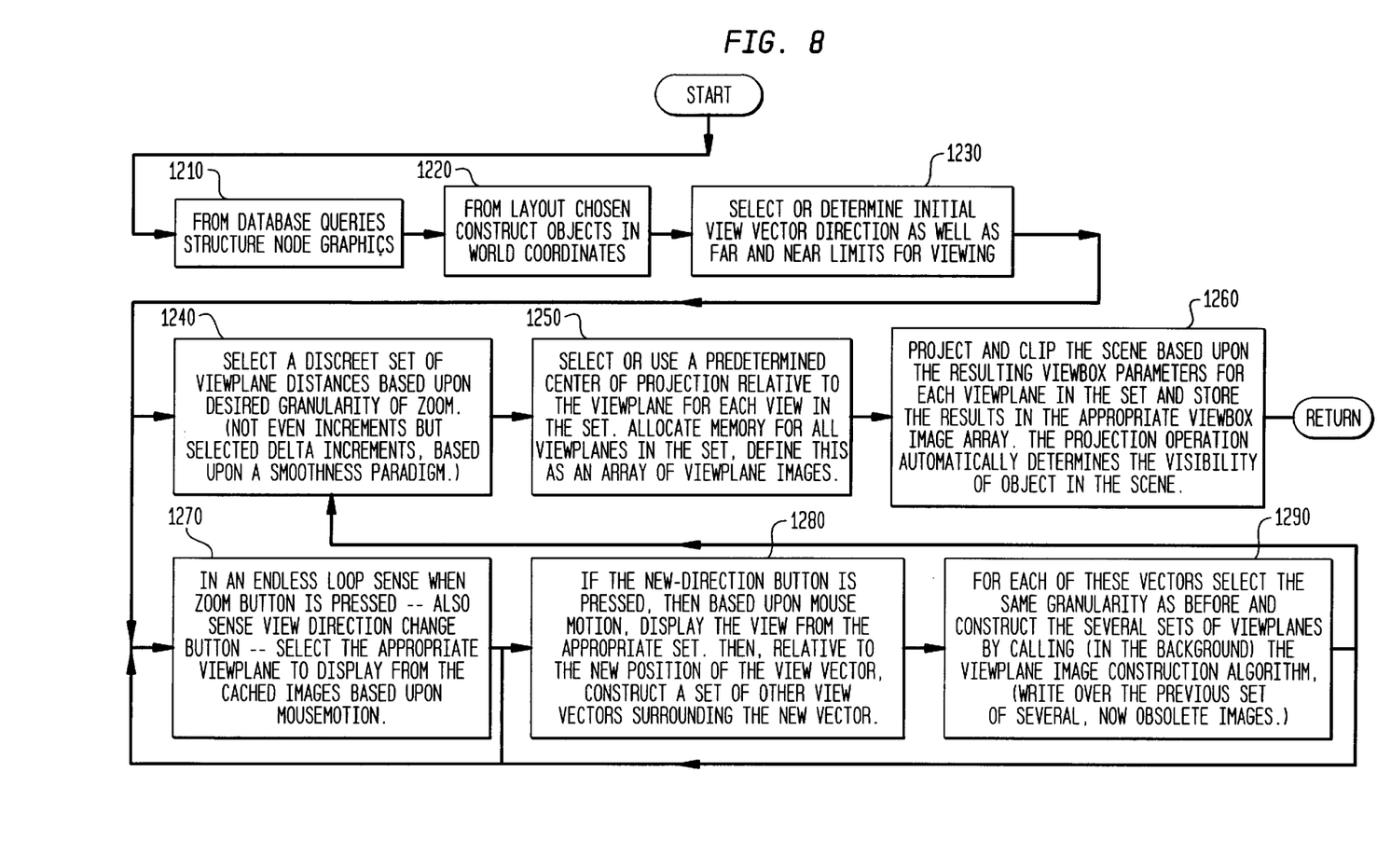
FIG. 8 is a flow diagram of the present invention providing the functionality of restrictive texture mapping.

Referring to FIG. 8 a flow diagram of the present invention providing the functionality of restrictive texture mapping is shown. The process begins in block 1210 with a user selecting the data to be visualized. The data is ordinarily stored in a database. The user then selects a nodal layout of images and images or objects are constructed in each node as shown in block 1220. In block 1230 the user selects the view orientation so that the restrictive texture mapping of the present invention can be implemented.

When the user wants to perform a continuous scaling function on an image a discrete set of view plane sizes is selected, as shown in block 1240, such that the scaling appears continuous to the user. At this point several things occur. Memory is allocated in bock 1250 to store each image size; the direction of scaling chosen by the user, either larger sizes or smaller sizes, is determined in block 1270 and the next view plane is selected for display from the memory as directed by block 1245. In block 1280, the information from block 1270 is used to determine whether a new image is selected and if so a new set of view planes is constructed in block 1290. Ultimately in block 1260 the resized images are retrieved from memory and displayed to the user.

In addition to continuous scaling, restrictive texture mapping has the advantage of enabling the rendering of the respective depths of various objects displayed to a viewer.

Ordinarily, an object's depth within a display is rendered by calculating depth in the position of each pixel of the object. With restrictive texture mapping, however, since all planes in the display are viewed orthogonally depth can be shown with simple algorithms, such as objects in the plane farthest from the viewer are painted before objects in a plane nearer the viewer. With the ability to render depth in the display of data in accordance with the present invention, other functions are possible as well, as for example, translating objects in one plane with respect to objects in another plane.

Much of what is described above has been implemented by the inventors in a system known as DataSpace and developed in Bell Laboratories. The foregoing merely illustrates the principles of the present invention. Those skilled in the art will then be able to devise various modifications, which although not explicitly described or shown herein, embody the principles of the invention and are thus within its spirit and scope.

What is claimed is:

1. A data visualization system for displaying relatively large amounts of data within a limited display space, comprising:

a user interface for specifying a segmentation of said data into at least one relation responsive to a user's query, for specifying a nodal layout of said segmentation of data within said display space and for mapping said segmented data to said nodal layout;

means responsive to said user interface for segmenting and mapping said data according to said specification;

display means for displaying said segmented mapped data presented in said specified nodal layout, each node of said specified nodal layout to be displayed from a single orientation normal to a display surface of said display means;

caching means for storing a variety of available sizes of said displayed segmented mapped data for display at a future time; and means for providing continuous scaling of said displayed segmented mapped data.

2. A system according to claim 1 wherein said means for providing continuous scaling includes means for providing near continuous scaling.

3. A system according to claim 1 further comprising means for rendering a depth dimension of said displayed segmented mapped data.

4. A method of visualizing relatively large amounts of data within a limited display space, said method comprising the steps of:

segmenting said data into at least one relation responsive to a user's query;

specifying a layout of at least one node within said display space for displaying said segmented data;

mapping said segmented data to said nodal layout;

texture mapping said segmented data with respect to said nodal layout;

for each said at least one node generating substantially all available scales of said segmented, texture mapped data viewed from a single orientation normal to a surface of a display;

caching said generated scales in available memory; and retrieving and displaying said cached scales when prompted by said user.

5. A method according to claim 4 wherein said displaying includes a continuous scaling of said segmented mapped data in response to said user's input for said continuous scaling.

6. A method according to claim 5 wherein said continuous scaling includes near continuous scaling.

7. A method according to claim 4 further comprising rendering a depth dimension of said displayed segmented mapped data.

8. A method of analyzing data, said data stored in at least one relation, said method comprising the steps of:

formulating a query based on the schema of said at least one relation of said data;

segmenting said data;

specifying a nodal layout of said segmented data;

mapping the schema of said segmented data to said nodal layout;

texture mapping each segment of said segmented data to its respective node in said nodal layout;

for each node of said specified nodal layout generating scales of said segmented, texture mapped data, each said generated scale viewed from a single orientation normal to a surface of a display;

caching said generated scales in memory;

retrieving and displaying said segmented, texture mapped data on said display; and exploring said displayed data, said exploring including continuously scaling at least one segment of said displayed data.

* * * * *